March 27, 1934.   R. B. DAY   1,952,424
SEALING RING AND METHOD OF BUILDING SAME
Filed May 21, 1932   3 Sheets-Sheet 1

Inventor
Ralph B. Day
By
Attorney

March 27, 1934.   R. B. DAY   1,952,424
SEALING RING AND METHOD OF BUILDING SAME
Filed May 21, 1932   3 Sheets-Sheet 2

Inventor
Ralph B. Day

Attorney

March 27, 1934.　　　R. B. DAY　　　1,952,424
SEALING RING AND METHOD OF BUILDING SAME
Filed May 21, 1932　　3 Sheets-Sheet 3

Inventor
Ralph B. Day

By

Attorney

Patented Mar. 27, 1934

1,952,424

UNITED STATES PATENT OFFICE 1,952,424

SEALING RING AND METHOD OF BUILDING SAME

Ralph B. Day, Akron, Ohio, assignor to Wingfoot Corporation, Wilmington, Del., a corporation of Delaware Application May 21, 1932, Serial No. 612,737

17 Claims. (Cl. 18—45)

This invention relates to improvements in sealing rings and the like, more particularly adapted to seal the space between the beads of a tire and to assist in properly shaping the beads during vulcanization of the tire.

In the vulcanization of a pneumatic tire, especially where the fluid pressure needed to maintain the tire in contact with the vulcanizing mold is admitted directly into the tire without the aid of a container such as an airbag or the like, it usually is customary to seal the space between the beads whereby a suitable pressure may be maintained in the tire and escape of the pressure fluid prevented. Metal sealing rings have been proposed for this purpose and under some conditions may be reliably used, but ordinarily great difficulty is encountered in placing a metal ring in its proper position due to the non-flexing characteristic of the metal. For this reason it is desirable to use a sealing ring formed of rubber or other suitable flexible material. However, in using a rubber sealing ring it has been found that shrinkage or transverse distortion occurs, particularly in the sidewalls of the ring and unless some means is provided to resist this shrinkage, the useful life of the ring is shortened materially.

It is an object of this invention to provide a sealing ring of the character referred to having means to resist the shrinkage or transverse distortion of the ring.

Another object is to provide a sealing ring having a plurality of flat springs arranged transversely in the body of the ring whereby these springs will resist transverse distortion of the ring.

A further object is to provide novel means for holding the springs in proper position in the ring.

A further object is to provide a novel method of building a sealing ring of the character referred to whereby the springs may be properly embedded in the ring.

Figure 1:
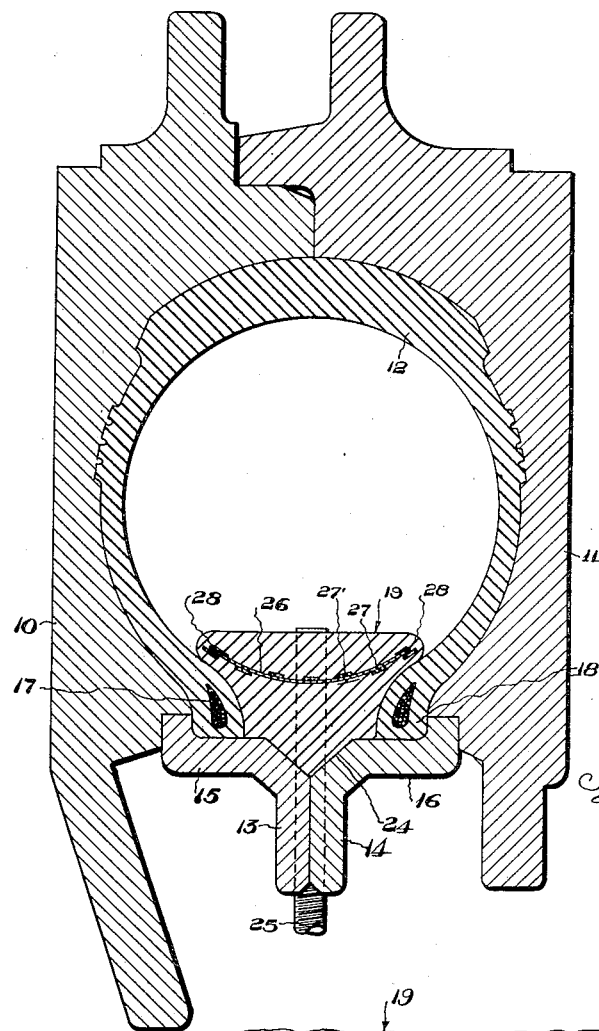
Figure 2:
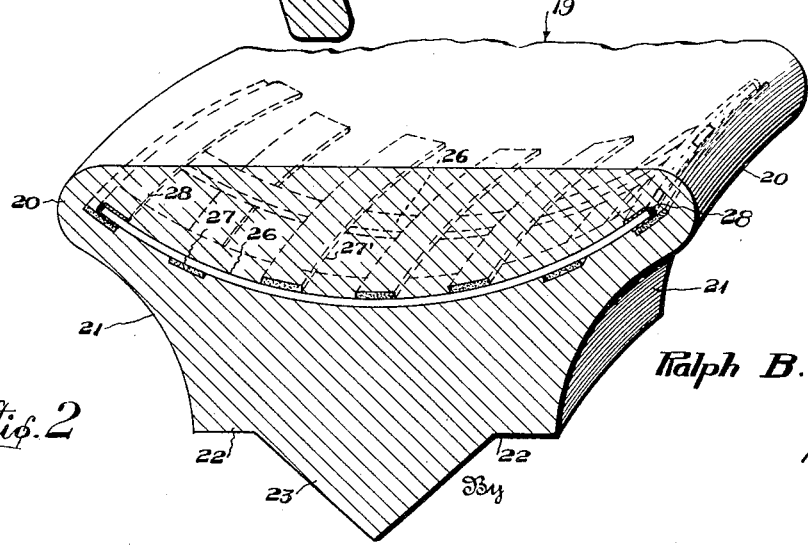
Figure 3:
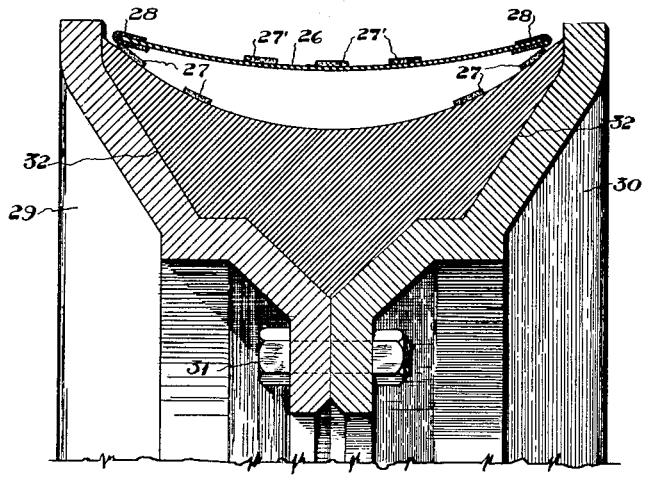
Figure 4:
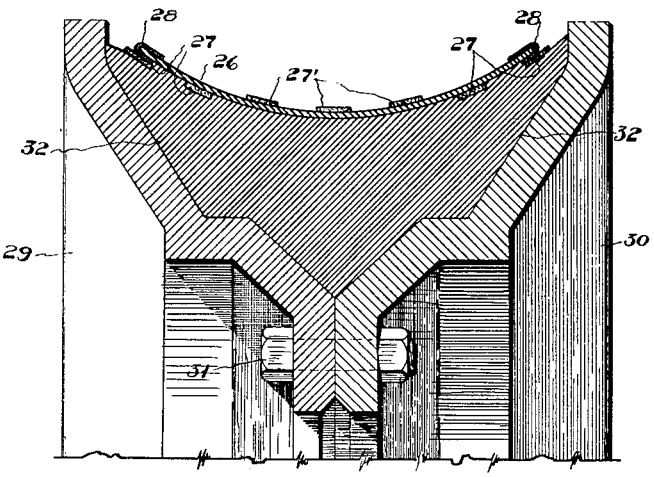
Figure 5:
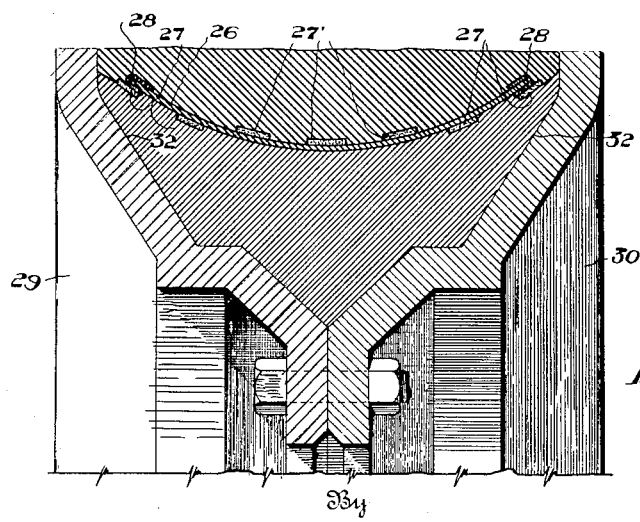
Figure 6:
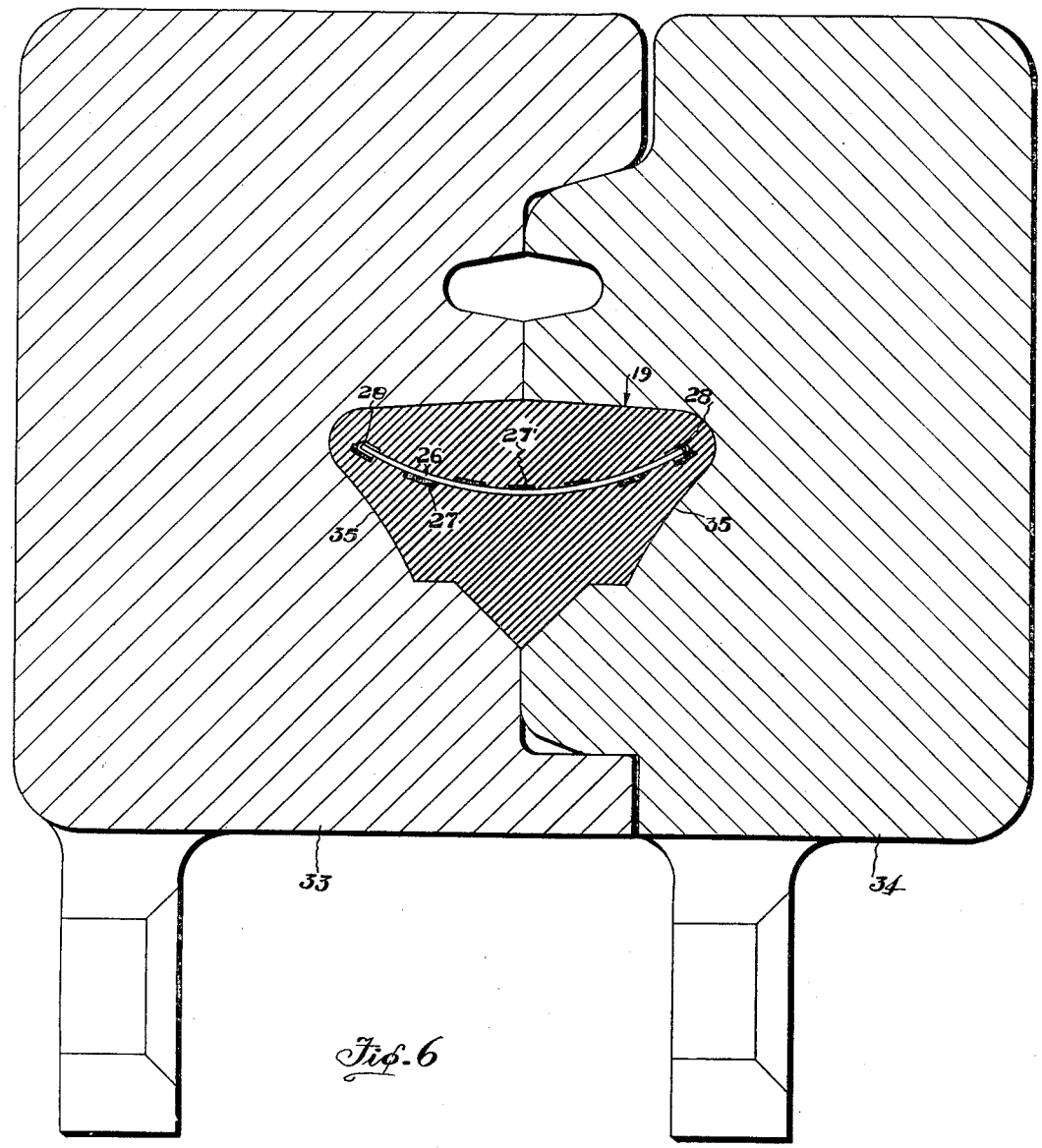

The foregoing and other objects and advantages will become apparent from the following description in connection with the accompanying drawings, wherein I have shown one embodiment of the invention. In this showing:

Fig. 1 is a transverse, sectional view through a portion of a mold having a tire and sealing ring therein, Fig. 2 is a partial perspective view of the sealing ring, Figs. 3, 4 and 5 are partial sectional views illustrating one method by which the sealing ring is built, and Fig. 6 is a partial sectional view of a mold in which the sealing ring is cured.

Referring to the drawings the numerals 10 and 11 indicate respectively, a pair of mold sections of conventional construction adapted for use in the vulcanization of pneumatic tires. These sections may be secured together in the usual or any suitable manner (not shown) and each section contains a cavity arranged whereby a pneumatic tire 12 of the usual construction can be received therein, as will be understood. A pair of mold rings 13 and 14, which may be formed integral with the respective mold sections, or which may be separate therefrom and suitably assembled in the mold structure, are provided with flanges 15 and 16 respectively, against which rest the inner portions of the tire beads 17 and 18. The flanges 15 and 16 have outwardly projecting portions which extend around the heels of the beads in the usual manner.

The sealing ring provided by this invention is indicated as a whole by the numeral 19, and is adapted to be arranged between the beads of the tire substantially as indicated in Fig. 1. This sealing ring is formed of rubber or other material of similar properties which is so compounded as to permit of continuous use over a long period of time without serious injury from the successive heating endured in use by the ring. Any of these methods, well known to those skilled in the art, may be used for compounding the ring in the manner explained.

In the present instance, the outer portion of the ring is its widest portion, being rounded as at 20 to provide a wing on each side thereof. Inwardly of the portions 20, each side of the ring is curved as at 21 to receive the beads of the tire. After the latter is cured, the curves of the beads will correspond to these curves 21. The inner periphery of the sealing ring is formed with surfaces 22 which rest upon the flanges 15 and 16 of the mold rings and the inner central portion 23 tapers substantially to a point when viewed in transverse cross section. This portion 23 rests snugly in a groove 24 formed in the mold rings 13 and 14 by beveling the sides of the latter as shown in Fig. 1. A suitable hollow stem 25 is embedded in the sealing ring in the usual manner whereby fluid under pressure can be admitted to the interior of the tire. The stem extends through suitable openings in the mold rings to be connected to a source of pressure through valve control means (not shown). The form of the sealing ring may vary according to the type of mold and tire with which it is to be used and I do not limit myself to the precise form illustrated and described.

A sealing ring of the character described may be effectively used during the curing of a few tires, but it has been found that shrinkage or transverse distortion occurs particularly in the sidewalls of the ring. In some instances this shrinkage begins after the ring has been used but once and while the precise reasons for the shrinkage are not fully understood, repeated tests have proven this to be the case. Obviously, this shrinkage reduces the size of the sealing ring, causing it to lose its effectiveness as a seal. Therefore, in order to increase the useful life of the sealing ring it becomes desirable to resist this transverse distortion.

If a plurality of spaced flexible or resilient members, such as the flat springs 26, are integrally embedded in the sealing ring in substantially the position shown, they will resist distortion in the sidewalls and materially increase the useful life of the ring. These springs may be flexed to assume the shape shown whereby they will be under tension and consequently exerting a pressure tending to maintain the sidewall rubber in its original position, or they may be made to normally assume the shape shown without flexing whereby any subsequent flexing caused by inward movement of the sidewall rubber will result in a tendency of the springs to return the rubber to its original position.

Whether or not the springs are placed under tension, I prefer to assist the rubber in holding the springs in proper position therein by embedding a plurality of spaced rings 27 and 27' at suitable points on the inner and outer surfaces of the springs. I have shown seven of such rings in the drawings, three on one side of the springs and four on the other, but obviously, this number and the location of the rings may be varied as desired. The rings 27 in this instance are formed of a plurality of wires similar to the conventional bead wires and will assist the rubber in holding the springs in proper position. The use of the rings 27 may be dispensed with and very good results will be obtained, but I prefer to use these rings in the manner referred to. Also, I prefer to arrange a piece of fabric 28 adjacent the ends of the springs in the manner indicated.

In building my sealing ring, I use a pair of complementary, annular forming members 29 and 30, connected together as at 31, each member being formed with a complementary recess 32 to provide a cavity of a size and shape to permit the sealing ring to be built and partially formed therein. The forming members may be mounted for rotation in any suitable manner (not shown), and they may be of collapsible construction, if desired.

Referring to Fig. 3, the sealing ring is first partially built up to the point where the springs are to be inserted. In building the ring, it has been found convenient to use the compounded rubber in strip form, wrapping the strips around the building form until the ring reaches substantially the condition shown in Fig. 3. The rubber is, of course, uncured at this stage of the operation and is sufficiently plastic to permit it to be pressed down and compacted to completely fill the lower portion of the building form cavity. If desired, a conventional stitching or pressing tool may be used to facilitate compacting of the rubber.

The wire bands 27 are then wrapped around the rubber in substantially the position shown. These wire bands may be separately wrapped and secured in position, or a single length of the wires may be wrapped a plurality of times and secured in any suitable manner, as will be understood. Next, the springs 26, having the fabric strip 28 adjacent each end to prevent the spring ends gouging out parts of the rubber, are arranged successively in spaced position with respect to each other and, as shown in Fig. 3 with the portions intermediate their ends spaced from the rubber. These springs may be of any desired width and thickness as long as they are not too stiff to prevent their functioning properly. The wire bands 27' then are wrapped around the springs until the latter are brought into contact with the rubber, substantially as shown in Fig. 4. The bands 27' also may be separately wrapped and secured, or a single length of wires may be wrapped a plurality of times and suitably secured. It will be apparent that the bands 27' place and hold the springs under tension in the sealing ring, while the bands 27 serve as abutments for the springs.

After the springs have been properly secured, the sealing ring is completed by wrapping strips of the compounded rubber around the springs and compacting the rubber until the ring reaches substantially the condition shown in Fig. 5. Provision is made, of course, for the inclusion of the hollow stem 25 in any conventional manner.

As before stated, it may be desirable to embed the springs in the ring without placing them under tension and in this case, the springs preferably normally have the shape shown in Fig. 4, whereby they may contact the rubber without flexing. With this arrangement the bands 27' may or may not be used to assist the rubber to hold the springs in position, but it is preferred to use these bands.

In Fig. 6 I have shown a pair of mold rings 33 and 34 provided with complementary cavities 35 of the size and shape desired in the finished ring. Any suitable means (not shown) may be used for securing these rings together. The sealing ring is removed from the forming members, by collapsing the latter if they are of collapsible construction, or by separating the members, and is transferred to the mold rings 33 and 34 in which it is cured in the customary manner.

It is believed to be obvious that I have provided a novel method of constructing a sealing ring and that a ring constructed in accordance with my invention may be used many times without serious shrinkage.

Although I have illustrated one form of the sealing ring and one method by which it may be built, it will be apparent to those skilled in the art that the invention is not limited to such form and method but that various modifications may be made without departing from the spirit of the invention or the scope of the sub-joined claims.

I claim:

1. A sealing ring of rubber or other material of similar properties having resilient means integrally embedded transversely therein resisting transverse distortion of the ring.

2. A sealing ring of rubber or other material of similar properties having resilient means integrally embedded therein to resist transverse distortion of the ring, said means being normally under tension.

3. A sealing ring of rubber or other material of similar properties having resilient means integrally embedded transversely therein resisting transverse distortion of the ring, and means for retaining said first named means in proper position in the ring.

4. A sealing ring of rubber or other material of similar properties having a plurality of springs integrally embedded transversely therein to resist transverse distortion of the ring.

5. A sealing ring of the character described having a plurality of flat springs embedded transversely therein to resist transverse distortion of the ring, and one or more members embedded in said ring for retaining said springs in proper position.

6. A sealing ring as described in claim 4 in which the springs are held under tension.

7. A method of building a sealing ring of rubber or other material of similar properties which comprises embedding a plurality of resilient members transversely in the ring.

8. A method of building a sealing ring of rubber or other material of similar properties which comprises embedding a plurality of transversely arranged resilient members under tension in the ring.

9. A method of building a sealing ring of rubber or other material of similar properties which comprises embedding a plurality of transversely arranged flat springs in the ring.

10. A method of building a sealing ring which comprises embedding a plurality of transversely arranged flat springs under tension in the ring.

11. A method of building a sealing ring which comprises forming a portion of the ring of a rubber compound or other material having similar properties, arranging a plurality of flexible members transversely of said portion, and forming the remainder of the ring of said compound around said flexible members whereby the latter will be embedded in the ring.

12. A method of building a sealing ring which comprises forming a portion of the ring of a rubber compound or other material having similar properties, arranging a plurality of flexible members transversely of said portion under tension, and forming the remainder of the ring of said compound around said flexible members whereby the latter will be embedded in the ring.

13. A method of building a sealing ring which comprises forming a portion of the ring of a rubber compound or other material having similar properties, securing a plurality of flat springs transversely of said portion and forming the remainder of the ring of said compound around said springs whereby the latter will be embedded in the ring.

14. A method of building a sealing ring which comprises forming a portion of the ring of a rubber compound or other material having similar properties, securing a plurality of flat springs transversely of said portion under tension, and forming the remainder of the ring of said compound around said springs whereby the latter will be embedded in the ring.

15. A method of building a substantially non-shrinkable annular member which comprises building a portion of the annular member of a rubber compound or other material having similar properties, securing a plurality of flexible members adjacent said portion, and completing the annular member by covering said flexible members with another portion of said compound whereby the flexible members will be embedded in the compound.

16. A method of embedding flexible members in an annular member which comprises forming a portion of the annular member of a rubber compound or other material having similar properties, compacting said portion, securing said flexible members against said portion, covering said flexible members with another portion of said compound, and compacting the latter portion.

17. A method of embedding flat springs in a sealing ring which comprises forming a portion of the ring of a rubber compound or other material having similar properties, arranging said springs transversely of said portion, and covering said springs with another portion of said compound until a ring of the desired size is formed.

RALPH B. DAY.